April 16, 1968 J. L. DAGUET 3,378,770

SYSTEM FOR QUADRATURE MODULATION OF TERNARY SIGNALS
WITH AUXILIARY OSCILLATION FOR USE IN
CARRIER REGENERATION AT RECEIVER

Filed Aug. 3, 1964 3 Sheets-Sheet 1

INVENTOR.
JACQUES L. DAGUET

BY

[signature]
AGENT

PRIOR ART

INVENTOR.
JACQUES L. DAGUET
BY
Frank R. Jufari
AGENT

April 16, 1968 J. L. DAGUET 3,378,770

SYSTEM FOR QUADRATURE MODULATION OF TERNARY SIGNALS WITH AUXILIARY OSCILLATION FOR USE IN CARRIER REGENERATION AT RECEIVER

Filed Aug. 3, 1964 3 Sheets-Sheet 3

INVENTOR.
JACQUES L. DAGUET
BY
[signature]
AGENT

United States Patent Office 3,378,770
Patented Apr. 16, 1968

3,378,770
SYSTEM FOR QUADRATURE MODULATION OF TERNARY SIGNALS WITH AUXILIARY OSCILLATION FOR USE IN CARRIER REGENERATION AT RECEIVER

Jacques Lucien Daguet, Paris, France, assignor to Telecommunications Radioelectriques & Telephoniques T.R.T., Paris, France Filed Aug. 3, 1964, Ser. No. 386,993
Claims priority, application France, Aug. 23, 1963, 945,536
7 Claims. (Cl. 325—38)

ABSTRACT OF THE DISCLOSURE

A pulse transmission system in which two ternary signals are modulated in quadrature on a carrier wave, and an auxiliary oscillation is modulated on the carrier with only one of the ternary signals. In the receiver the auxiliary oscillation is employed in the regeneration of the carrier oscillation, and to form a timing signal for sampling the demodulated signals. The demodulated signals are sampled at the zero crossovers of the auxiliary oscillation.

The invention relates to a system for the transmission of pulse signals in a prescribed transmission band. The instants of occurrence of the signals are determined by a timing frequency, for example in synchronous telegraphy or pulse-code modulation, and the pulse signals may assume the values +1, 0 and −1. The transmitter comprises two channels having modulators connected to a common carrier wave oscillator, for modulating the pulse signals of said channels on the common carrier oscillation with a relative phase shift of 90°. The signals thus modulated on the common carrier are transmitted in common over the transmission path. The receiver is provided with two receiving channels each having a demodulation member, to which a local carrier oscillation is applied for the demodulation of the incoming pulse signals.

A particularly advantageous embodiment of the kind set forth is described in United States application Ser. No. 277,770, now Patent No. 3,344,352, which corresponds to French Patent 1,330,777. At the transmitter an uninterrupted sequence of input signals is converted in this case into a direct voltage +U, which is brought to zero (0) from the timing instant at which the corresponding input pulse is zero, after which the direct voltage (−U) assumes a value opposite that of the said direct voltage at the next-following timing instant, at which a next-following input pulse is formed, which is treated in the same manner as a first of a second uninterrupted sequence and so on. A pulse producer which adapts the waveform of the signals to be transmitted to the repetition frequency of the timing instants.

In the transmission system described above there is obtained a sharp discrimination of the signals to be transmitted and an advantageous cross-talk factor between the signals in the two channels, while the requirements for phase equalisation are reduced and a very high quantity of information is transmitted in the given transmission band, which quantity is theoretically 6000 c./s. with a transmission path of 3000 c./s.

The invention has for its object to provide in a transmission system of the kind set forth, in which like in the system according to the French patent, the direct current component is transmitted without enlarging the bandwidth, the possibility of restoring in a simple manner the carrier frequency and the timing frequency at the receiver.

The system according to the invention is characterized in that for restoring the local carrier frequency and the timing frequency at the receiver at least one modulator stage of the transmitter receives a sinusoidal oscillation as a modulating voltage, the oscillation becoming zero at scanning instants determined by the timing frequency. The sinusoidal oscillation thus modulated on a carrier oscillation, together with the pulse signals, is transmitted to the receiver.

According to a further development of the invention the sideband frequencies obtained by modulation of the sinusoidal oscillation on the carrier are mixed, subsequent to frequency selection, at the receiver, in a mixing stage and the sum frequency and the difference frequency obtained by mixing are separated in selection filters for restoring the carrier frequency and the pilot frequency.

The invention will now be described more fully with reference to the accompanying drawings, in which—

Figures 5, 6:
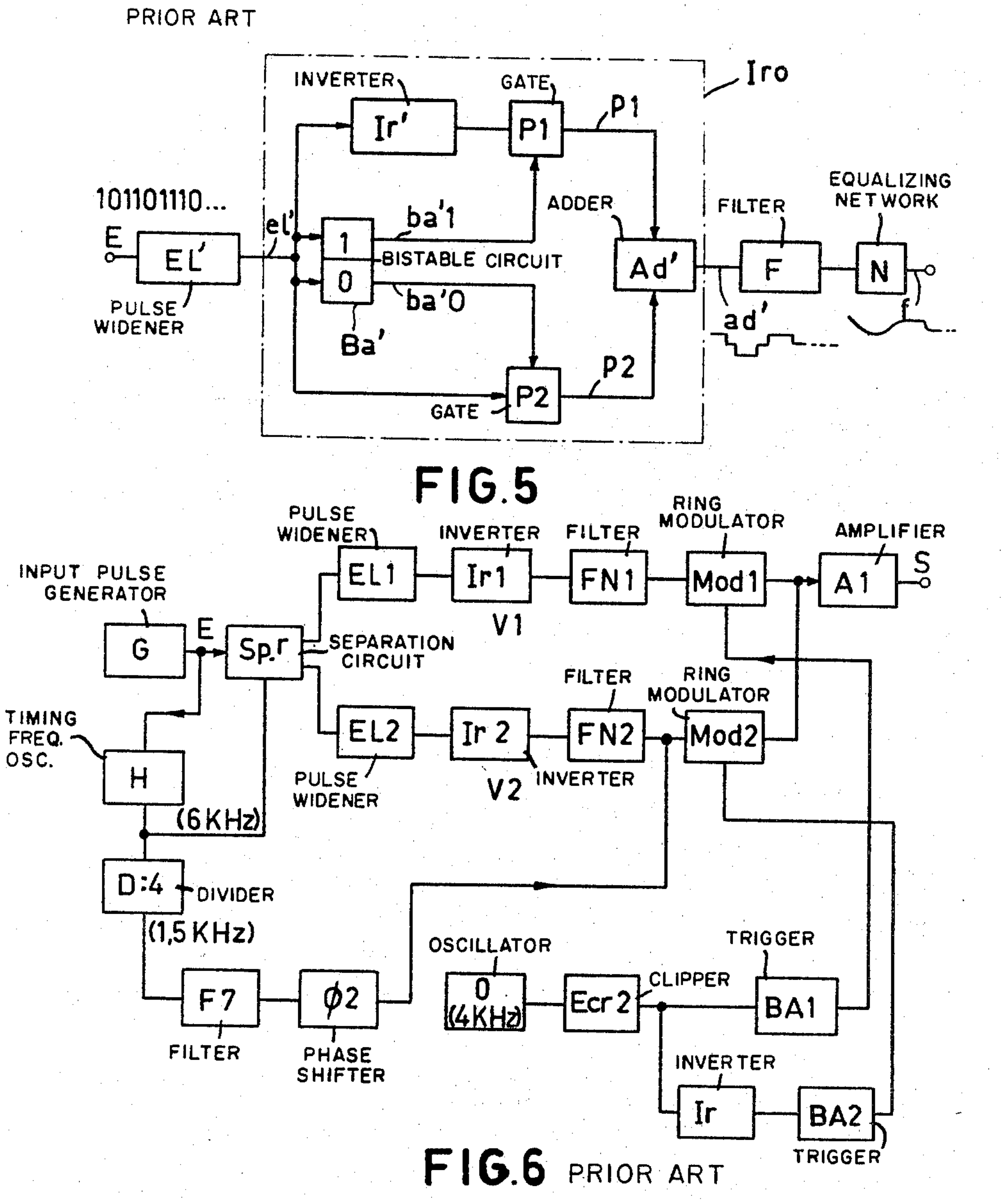
FIG. 5, FIG. 6 PRIOR ART
FIG. 5 shows a transmitter of the kind described in the prior French Patent 1,330,777.
FIGS. 6 and 7 show modifications of the devices of FIGS. 2 and 4 respectively.

Referring to FIG. 5 the transmitting device of the French patent will first be described. The digital signal is coded in binary code (for example 101101110 . . . ) and the pulses are applied to the input of a pulse widener EL′. The signal *el′* at the output of the pulse widener EL′ is transmitted directly to the bistable trigger B*a′* and to the coincidence gate $P_2$ and through the inverting stage I*r′* to the coincidence gate $P_1$.

The trigger B*a′* changes state at each transition of the signal *el′* from the level +1 to the level 0. The trigger B*a′* in the state 1 has, at the output concerned, an output signal of positive polarity (signal *ba′*1) and at the other output signal *ba′*0, which is then zero, so that the coincidence gate $P_1$ is rendered conducting. Conversely, when the trigger B*a′* is in the state 0, signal *ba′*0 is positive so that the coincidence gate $P_2$ is rendered conducting. These two gates are therefore alternately conducting and non-conducting under the control of the trigger B*a′*, so that the signal *el′* is transmitted directly or with inverted polarity. The output of the gate $P_1$ supplies a signal $p_1$ of a value 0 or of negative polarity and the output of the gate $P_2$ supplies a signal $p_2$ of a value 0 or of positive polarity.

The signals $p_1$ and $p_2$ are added in a circuit A*d′*, which supplies a signal *ad′* with steep edges.

It is obvious that the assembly I*r*0 formed by the elements B*a′*, I*r′*, $P_1$, $P_2$, A*d′* constitutes an inverting switch which passes the signals *el′* alternately with positive polarity and negative polarity.

Figure 3:
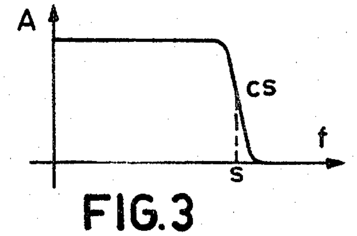
FIG. 3 shows the characteristic curve of a filter F.

The signal *ad′* is applied to the input of a low band-pass filter F having a limit frequency of 1500 c./s. The amplitude (A) characteristic curve as a function of the frequency *f* preferably has the shape shown in FIG. 3; it has a substantially horizontal portion for the major part of the passband, which portion terminates in a curved portion having a centre of symmetry *cs* on the abscissa *s* (2*s* is the speed in baud at E). In this case $s=1500$ c./s. This filter is connected to an equalising network N, for example formed by a Mode network having a constant impedance, which multiplies the amplitude by a factor:

$$\frac{\pi f}{2s} \cdot \operatorname{cosec} \frac{\pi f}{2s}$$

The assembly formed by the filter F and the series-connected equalising network N converts the signal *ad'* into a signal *f*, the edges of which are smoothed down.

Figure 2:
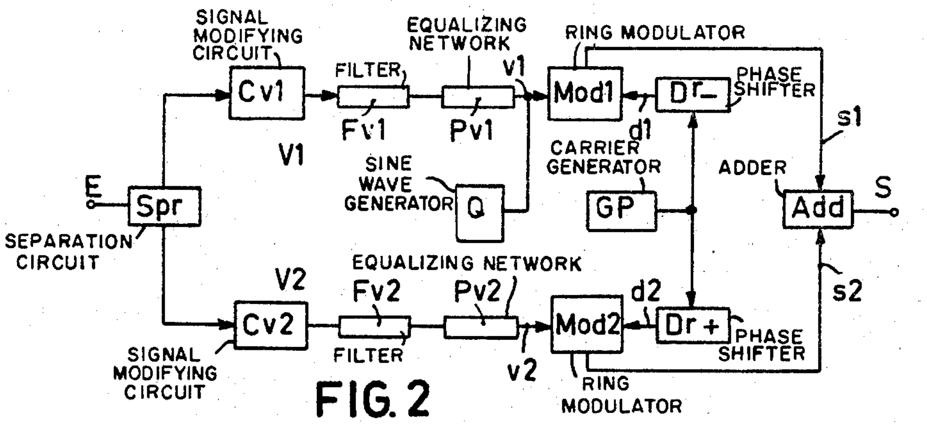
FIG. 2 shows the diagram of a transmitter according to the invention for the transmission of information in a band channel of 3000 c./s. in bandwidth.

FIG. 2 shows a transmitter according to the invention for the transmission of digital information through a channel having a bandwidth 3000 c./s. The signal is transposed by amplitude modulation on a carrier frequency to the centre of the channel.

The device shown in FIG. 2 permits of transmitting 6000 baud. To this end two channels V1 and V2 are provided for the transmission of pulse signals of equal carrier frequencies, which have a relative phase shift of 90°. A separation circuit S*pr* receives the input signals (0 and 1) at a rate of 6000 baud and separates the signals of even and odd ordinal numbers; in this way two different signals are formed at a rate of 3000 baud, which are processed in the channels V1 and V2.

Apart from the element Q, which will be explained more fully hereinafter, the two channels are the same. The elements are designated by the numerals 1 or 2 for the channels V1 and V2 respectively. In the channel V1 the signals are first applied to a circuit C*v*1 shown in FIG. 5. The signals are then transmitted through a low bandpass filter F*v*1 having a limit frequency of 1500 c./s. This filter suppresses the undesired part of the spectrum beyond the transmission channel above 1500 c./s. After the filter F*v*1 the signals pass through a phase equalising network P*v*1 for linearising the phase with respect to the frequency of the passband.

Figure 1:
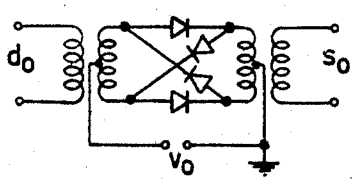
FIG. 1 shows the ring modulators employed for modulation at the transmitter and for demodulation at the receiver.

The signals $v_1$ and $v_2$ are then applied to ring modulators M*od*1 and M*od*2 respectively, which may have the structure shown in FIG. 1.

For the modulators a carrier generator GP supplies a carrier wave which is shifted in phase through +45° or −45° by phase shifting networks D*r*+ and D*r*− respectively. The signals *d*1 and *d*2 thus obtained are supplied to inputs of the modulators M*od*1 and M*od*2 respectively. The signals *s*1 and *s*2 at the outputs of the modulators are combined in a circuit A*dd* and transmitted to the transmitting path at S.

The inputs and the outputs $d_0$, $v_0$, $f_0$ of FIG. 1 correspond with $d_1$, $v_1$, $s_1$ and with $d_2$, $v_2$, $s_2$ of the modulators M*od*1 and M*od*2 respectively.

The construction of FIG. 2 so far described does not differ from that described in said French Patent 1,330,777, apart from the particular form of the modulators M*od*1 and M*od*2; the foregoing is therefore given only for a better understanding.

It should furthermore be noted that each channel has a passband of 1500 c./s. before the modulation and 3000 c./c. after the modulation. In each of the pass bands of low frequency (prior to the modulation) therefore 3000 scans are performed per second, whilst the useful signal assumes one of the values 0, +U, −U.

In the embodiment shown for the device according to the invention a sinusoidal signal passes through one of the two channels of low frequency; this signal becomes zero 3000 times per second at the scanning instants (i.e. instants at which the signals will be scanned in a receiver to regenerate an output signal), which means that the frequency of the sinusoidal signal is 1500 c./s. This additional signal cannot modify the value of the useful signal in the path at the scanning instants (since it is zero at said instants) (this also applies to the timing instants at the receiver end). The generator of the said sinusoidal signal of a frequency of 1500 c./s. is designated in FIG. 2 by Q.

Figure 4:
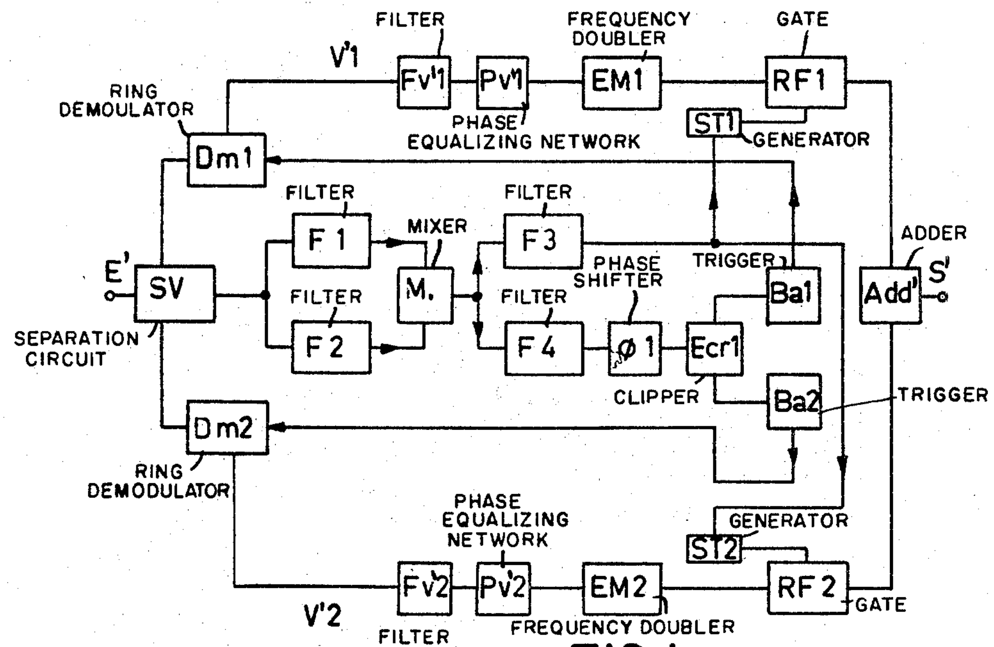
FIG. 4 shows the diagram of a receiver according to the invention co-operating with the transmitter of FIG. 2.

FIG. 4 shows the receiver cooperating with the transmitter of FIG. 2. The incoming signals are received in the form of amplitude modulation signals, the carrier frequencies of which have a relative phase shift of 90°. These input signals are applied at E' to the input of a separation circuit SV. The outputs of the separation circuit SV are connected to two ring demodulators D*m*1 and D*m*2 respectively and after the signals have passed through said demodulators, the latter supply the signals of V1 and V2 (FIG. 2), so that the demodulated pulses are the pulses of even and odd ordinal numbers of the initial input pulses.

Therefore, two separate channels V'1 and V'2 of identical structure are provided, which are joined in a common output channel. In each of the channels the elements are designated by the numerals 1 and 2 respectively.

In the channel V'1 and V'2 respectively the signals are transmitted from the output of the modulator D*m*1 D*m*2 respectively to a frequency doubler EM1 by means of a low bandpass filter F*v'*1 and a phase equalising network P*v'*1. After the doubler EM1 the signals pass through a gate RF1 under the control of a timing pulse generator ST1 the synchronisation of which will be explained hereinafter.

The signals from RF1 and RF2 are short, positive pulses, which represent the odd and even digits respectively and which are supplied to the adding circuit A*dd'*, the output S' of which supplies the initial input signal.

The construction of FIG. 4 so far described does not differ from that of FIG. 4 of the said French patent specification; the description so far given only serves for a better understanding.

According to the invention the carrier frequency and the timing frequency are restored at the receiver end in the following manner.

The modulation of the sinusoidal oscillation of 1500 c./s. on the carrier frequency *f* (for example 2000 c./s.) supplies in the transmission path two frequencies $f-1500$ and $f+1500$ c./s., which means 500 c./s. and 3500 c./s. respectively.

If there is a difference $\epsilon$ in the synchronisation between the reception and the transmission along the transmission path, the two frequencies $f+\epsilon-1500$ and $f+\epsilon+1500$ occur at the receiver end, which frequencies are filtered at the output of the separation circuit SV by means of filters F1 and F2.

By mixing these two frequencies in a mixing stage M*o*, frequencies of 3000 c./s. and frequencies of $2(f+\epsilon)$ are obtained, which can be easily separated by filters F3 and F4 respectively. The frequency of the filter F3 permits, by means of suitable phase-shifting networks (not shown), of synchronising the generators ST1 and ST2.

The frequency $2(f+\epsilon)$ excites, after phase displacement in $\phi$1 and subsequent to peak clipping in E*cr*1, by its leading edge a trigger B*a*1 and by its trailing edges a further trigger B*a*2. These two triggers serve as frequency dividers by a factor 2 and after filtering they furnish two 90° phase-shifted frequencies of a value $f+\epsilon$, which are applied to the demodulators D*m*1 and D*m*2 respectively, which serve as carrier wave demodulators in the channels V'1 and V'2 respectively.

Each of these carrier waves is obtained with a difference $\pi$ owing to the division by 2. The demodulation of these carrier waves supplies a signal, the polarity of which is equal to that of the transmitted signal or opposite thereto.

It will be obvious that in the system according to the invention described above the value zero is received with the value 0, whereas the detector supplies a 1 which is received as a +1 or a −1, or in other words, the two polarities have the same information values.

FIG. 6 shows an advantageous variant of the transmitter of FIG. 2. The generator G of the input pulses (1 and 0), which synchronises a timing frequency oscillator H, (6 kc./s.) supplies its pulses to a separation circuit S*pr*, which supplies pulses of an even and of an odd order for the channels V1 and V2 respectively. Each of these pulse sequences is processed in the maner shown in FIG. 2.

In the channel V1, for example, a pulse widener EL1 (identical to EL′ of FIG. 5) widens the binary, unipolar signals which are converted into signals without return to 0 between two successive values 1. Then an inverting stage Ir1, identical to Ir0 in FIG. 5, passes said signals alternately with positive and with negative polarity. An equalising filter FN1, formed by the combination of $F+N$ (FIG. 5), provides the suitable waveform of the signals. The ring modulator Mod1 receives at a central point the signals to be transmitted. This also applies to the modulator Mod2 for the path V2 (having the elements EL2, Ir2, FN2, identical to EL′, Ir1 and FN1). The 90° phase-shifted carrier waves are thus obtained from an oscillator O of 4 kc./s. by means of a clipper Ecr2, an inverting stage Ir and two triggers BA1 and BA2, which operate as divide-by-two members. The carrier waves are used directly with a rectangular waveform.

One of the modulators (Mod2) receives not only the signals to be transmitted but, at the same input a sinusoidal signal of 1.5 kc./s., which is obtained by division by 4 at D4 (in practice this is formed by two cascade-connected divide-by-two circuits), by filtering at F7 (medium frequency 1.5 kc./s.) and by suitable phase-displacement in $\phi 2$.

The outputs of the two modulators Mod1 and Mod2 are joined at the input of an amplifier A1, which supplies the level desired for the transmission path.

Figure 7:
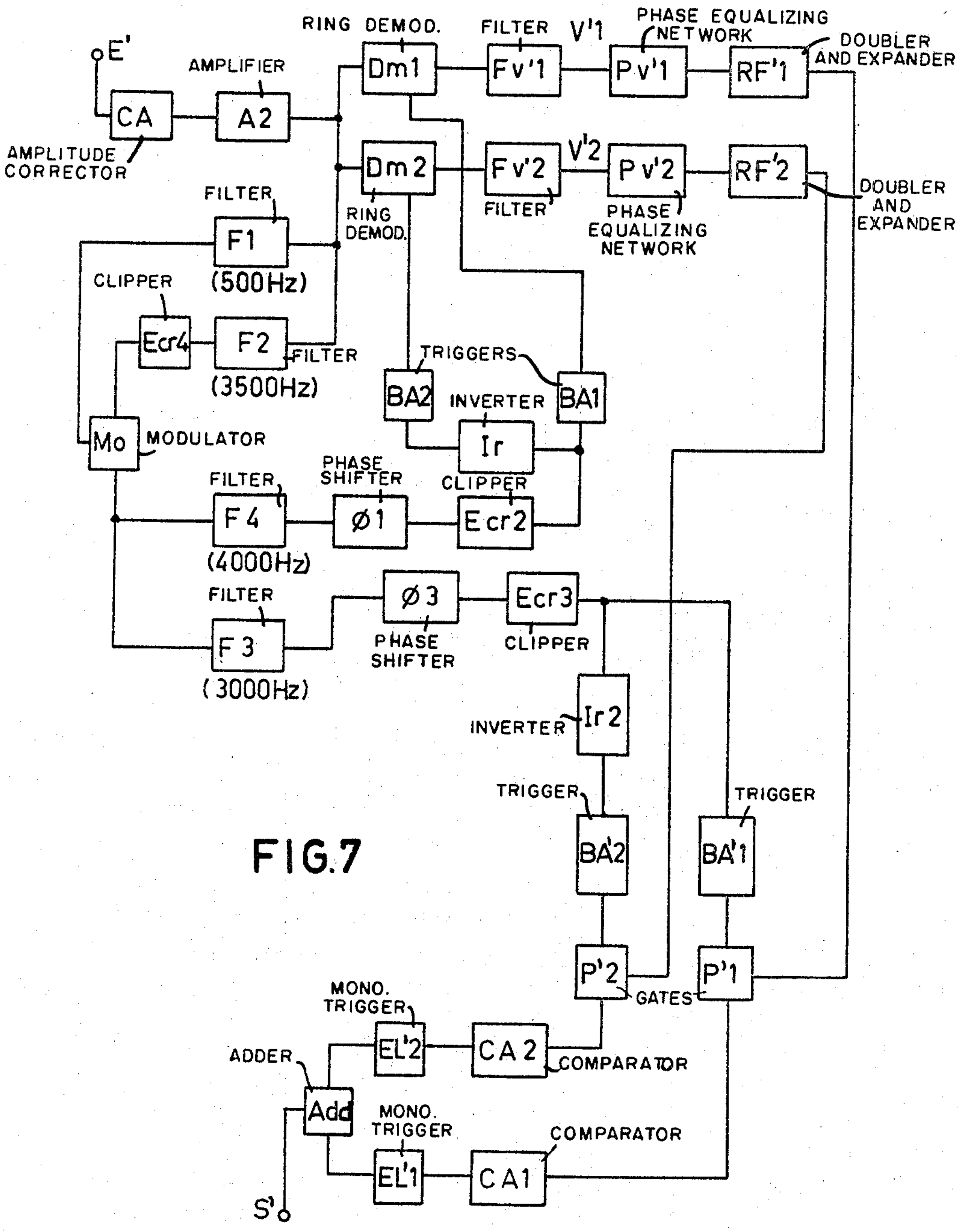

FIG. 7 shows an advantageous variant of the receiver.

The output voltage of the transmission path is first applied to a variable amplitude corrector CA, so that the level is equalised at the frequencies of 500 c./s. and 3500 c./s. and then to an amplifier A2 comprising four parallel-connected outputs.

Two of these outputs are connected to the channels V′1 and V′2, identical to those of FIG. 4 and having the elements Dm1, Fv′1, Pv′1 and Dm2, Fv′2, Pv′2. The two other outputs are connected to a device F1, F2, Mo, F3, F4 identical to those of FIG. 4 with the exception of the fact that it is desirable in this case to use a clipping amplifier (Ecr4) between the filter F2 and the modulator Mo. The filter F4 thus supplies a frequency of $$4 \text{ kc./s.} + 2\epsilon$$

and the filter F3 supplies a frequency of 3 kc./s.

In the same manner as the device Ecr2, Ir, BA1 and BA2 in the transmitter of FIG. 6, the same device is shown in FIG. 7 after a phase-shifting network $\phi 1$, which supplies the 90° phase-shifted carriers applied to the demodulators Dm1 and Dm2 as in FIG. 4.

In the channels V′1 and V′2 there are provided, after the ring modulators Dm1 and Dm2, directly the frequency doublers and expansion circuits RF′1 and RF′2 having a parabolic characteristic curve.

The said frequency doublers control gates P′1 and P′2, which scan the signals of Ba′1 and Ba′2 at the characteristic timing instants by means of short pulses derived from the frequency of 3 kcs./s. of the filter F3 by means of a device $\phi 3$—Ecr3—Ir2—BA′2+BA′1, equal to $\phi 1$—Ecr1—Ir—BA2+BA1 as described above. Comparison circuits CA1 and CA2, connected to the outputs of the gates P′1 and P′2 supply a pulse for each value of the signals lying above a predetermined threshold and monostable triggers EL′1 and EL′2 provide the initial width of the digital signal. The two sequences of pulses of even and of odd ordinal numerals are combined in an adder Add′. It will be obvious that no direct current amplifiers are required in the transmitter and receiver described above.

The invention is not restricted to the embodiments described above; particularly the additional sinusoidal signal may be injected simultaneously into the two channels of the transmitter by using a suitable phase adjustment. This additional signal may furthermore be introduced into a particular modulation element included in the output channels of the transmitter, which is common to the two said channels.

What is claimed is:

1. A transmission system for pulse signals in a predetermined band of the type comprising a transmitter, a receiver, and a transmission path between said transmitter and receiver, wherein said transmitter comprises means for producing first and second ternary coded signals having a predetermined pulse repetition frequency, a source of carrier oscillations, first and second modulators for modulating said first and second signals respectively in quadrature on said carrier oscillations, and means applying the outputs of said first and second modulators in common to said transmission path, and wherein said receiver comprises first and second channels each including demodulator means, means applying signals from said path to said first and second channels, means for producing a local carrier signal of the frequency of said carrier oscillations and a timing signal of said pulse repetition frequency, means applying said carrier signal to said demodulator means for demodulating the signals received from said path, each of said channels further comprising means for converting the output of the respective demodulators to a binary coded signal, and means responsive to said timing signals for scanning said binary coded signals to produce output signals corresponding to the level of said binary signals at predetermined scanning instants synchronized with said timing signals; wherein the improvement comprises a source of sinusoidal oscillations connected to only one of said first and second modulators for modulating said carrier oscillations, and said means producing said local carrier and timing signals comprises means for deriving the sum and difference frequency signals of said carrier and sinusoidal oscillations from said path, means for mixing said sum and difference frequency signals, and filter means connected to said mixing means for separately deriving said local carrier signal and timing signal, said sinusoidal oscillations having zero crossovers that coincide with said instants of scanning of said binary signals.

2. A transmission system for pulse signals in a predetermined band of the type comprising a transmitter, a receiver, and a transmission path between said transmitter and receiver, wherein said transmitter comprises means for producing first and second ternary coded signals having a predetermined pulse repetition frequency, a source of carrier oscillations, first and second modulators for modulating said first and second signals respectively in quadrature on said carrier oscillations, and means applying the outputs of said first and second modulators in common to said transmission path, and wherein said receiver comprises first and second channels each including demodulator means, means applying signals from said path to said first and second channels, means for producing a local carrier signal of the frequency of said carrier oscillations and a timing signal of said pulse repetition frequency, means applying said carrier signal to said demodulator means for demodulating the signals received from said path, scanning means responsive to said timing signals for scanning signals applied thereto to produce output signals corresponding to the level of said signals applied thereto at predetermined scanning instants synchronized with said timing signals, and means connecting the output of said demodulator means to said scanning means; wherein the improvement comprises a source of sinusoidal oscillations, means for modulating said carrier oscillations with said sinusoidal oscillations in phase with the modulation of only one of said modulators, and said means for producing said local carrier signal and timing signal comprises filter means for deriving the sideband frequency signals of said carrier and sinusoidal oscillations from said path, means for mixing said sideband frequency signals, filter means connected to the output of said mixing means for separately deriving the sum and difference outputs of said mixing means, and means for deriving said carrier and timing signals from said sum and difference frequency outputs respectively, said sinusoidal oscillations having a zero crossover at said scanning instants whereby said output signals are not modified by said sinusoidal oscillations.

3. The system of claim 2 comprising means for dividing the sum frequency output of said mixing means to produce said local carrier signal, and means for dividing the difference frequency output of said mixing means to produce said timing signal.

4. The system of claim 3 in which said means for dividing said sum frequency signal comprises first and second trigger circuits, and means applying said sum frequency signal to said trigger circuits with a relative phase shift, and means for deriving the local carrier signals for said demodulator means of said first and second channels from said first and second trigger circuits respectively.

5. The system of claim 2 comprising means for dividing the sum frequency output of said mixing means to produce said local carrier, a timing signal generator, means for dividing the difference frequency output of said mixing means, and means applying the output of said last mentioned dividing means to said timing signal generator as a synchronizing signal.

6. The system of claim 2 in which said sinusoidal oscillation has a frequency equal to half said pulse repetition frequency.

7. The system of claim 2 in which said modulators are push-pull modulators.

References Cited

UNITED STATES PATENTS

| | | | |
|---|---|---|---|
| 3,289,082 | 11/1966 | Shumate ---------- | 325—60 X |
| 3,311,442 | 3/1967 | De Jager et al. | |

FOREIGN PATENTS

| | | | |
|---|---|---|---|
| 1,330,777 | 5/1963 | France. | |

ROBERT L. GRIFFIN, *Primary Examiner.*

JOHN W. CALDWELL, *Examiner.*

J. T. STRATMAN, *Assistant Examiner.*